Feb. 10, 1970 W. H. SWAIN 3,495,149
COMMUTATING INDUCTOR FOR USE IN SILICON CONTROLLED
RECTIFIER POWER CONTROLLERS
Filed May 27, 1965 2 Sheets-Sheet 1

MAGNETIC SHUNT HAVING HIGH
RELUCTANCE RELATIVE TO
OVERALL LOOP.

INVENTOR.
WILLIAM H. SWAIN
BY

Feb. 10, 1970  W. H. SWAIN  3,495,149
COMMUTATING INDUCTOR FOR USE IN SILICON CONTROLLED
RECTIFIER POWER CONTROLLERS
Filed May 27, 1965  2 Sheets-Sheet 2

INVENTOR
WILLIAM H. SWAIN
BY

United States Patent Office 3,495,149
Patented Feb. 10, 1970

3,495,149
COMMUTATING INDUCTOR FOR USE IN SILICON CONTROLLED RECTIFIER POWER CONTROLLERS
William H. Swain, 1220 Stickney Point Road,
Sarasota, Fla. 33581
Filed May 27, 1965, Ser. No. 459,223
Int. Cl. H02p 7/50
U.S. Cl. 318—138                    4 Claims

ABSTRACT OF THE DISCLOSURE

This invention comprises a commutating inductor for use in SCR power controllers. It will outperform larger and more costly devices because provision is made to reset the core in between commutating pulses, and because energy may be released to a significant potential even though clamp diodes are used. Inductor structure and inverter circuits are shown in the figures.

---

This invention relates to a commutating inductor for use in silicon controlled rectifier power controllers, inverters and like circuits. The purpose is to provide increased energy in a shorter time at reduced size and cost with which to turn off SCR's which were hitherto in the conducting state. In the present inductor the core material is reset by the load current in between commutation pulses. This reduces the core and copper volume required to produce an SCR turn off pulse of a given energy level.

In the past, commutating inductor designs have been made bulky and expensive because the commutating pulse currents and load currents alike all tend to saturate the core material in one state which we may term the SET state. No significant restoring or RESET currents flowed during any part of the operating cycle. This required the use of large air gaps and large cross section cores with resulting increase in losses and heating and cost. The size and cost of commutating capacitors was also increased.

The primary purpose of the present invention is to provide for RESET currents in a commutating inductor. Then the core material can be swung from full RESET to full SET. This will reduce cost and weight of many parts.

The commutating inductor of the present invention is general and may be applied to a variety of inverter and power control circuits. Other objects and advantages of the invention will be apparent from the following description taken in conjunction with the accompanying drawings.

Figure 2:
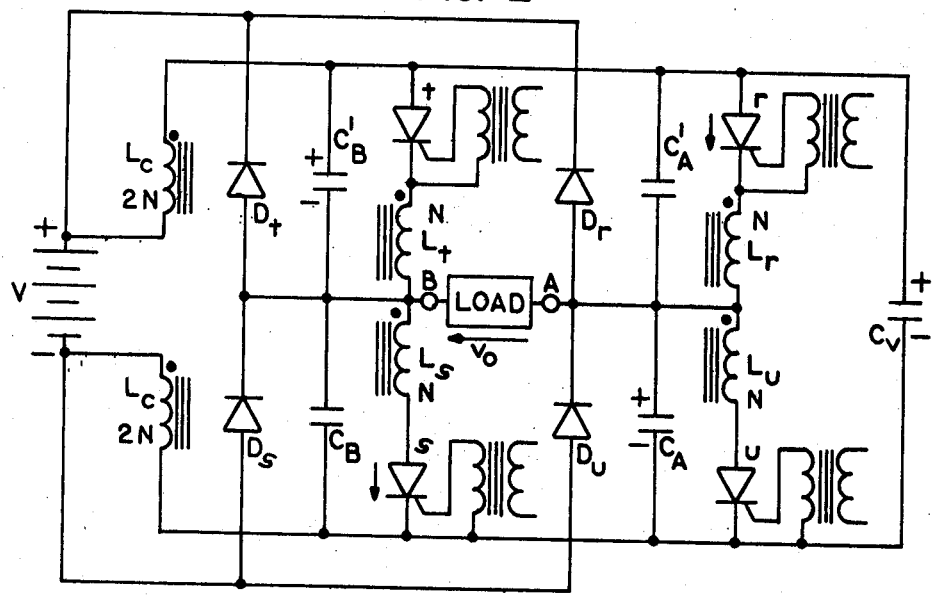
FIGURE 2 is a schematic representation of an electrical circuit using the commutating inductor of FIGURE 1 in a single phase bridge inverter.
Figure 1:
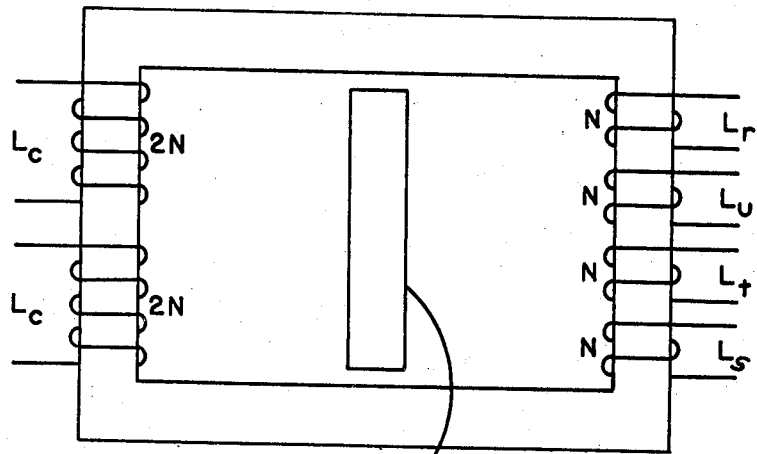
FIGURE 1 is a drawing of the basic inductor arranged for application in a single phase SCR bridge. The magnetic shunt has a high reluctance relative to the overall loop.

FIGURE 1 shows the commutating inductor in one of its many possible forms. The various windings of FIGURE 1 are connected as shown in FIGURE 2 which is a representation of a single phase SCR inverter or power controller. It will be seen that the commutation inductors are $L_r$, $L_s$, $L_t$, $L_u$. The two windings designated $L_c$ provide for reset of the core flux state in between commutation pulses, as will be seen later.

Several of the problems inherent in the usual inverter circuit are alleviated—sometimes by an order of magnitude—by the circuit of FIGURE 2, together with the inductor of FIGURE 1.

The magnetic shunt shown in FIGURE 1 may obtain its high magnetic reluctance relative to the overall loop including coils $L_r$, $L_s$, $L_t$, $L_u$ as well as coils $L_c$ by use of the air gap shown, or by use of a lower magnetic path length. The longer path length may on the other side of inductors $L_r$, $L_s$, $L_t$, $L_u$, or in another plane. However, the basic principle is the same.

In operation in the circuit of FIGURE 2 the two coils designated $L_c$ and the magnetic shunt will be seen to reset the magnetic state of the core material for inductors $L_r$, $L_s$, $L_t$, $L_u$ and to provide a significant voltage during the energy release of these inductors after a commutating pulse—thus increasing possible operating speed.

In FIGURE 2, assume that the positive state exists as indicated by voltage and current notations. Current flowing in coils $L_r$ and $L_s$ tends to magnetize the core in what we will call the positive, or SET sense, i.e. current into the dot end of the coil tends to SET the core. However, the magnetic field intensity tending to set the core is the load current times 2N turns divided by the mean flux path length around the large dimension of the core shown in FIG. 1. A counter acting, or RESET field exists in the same path due to the load current flowing through the two 2N windings designated $L_c$. These compensating coils have a strength, taken together, double that of the original SET coils. Then for any reasonable magnitude of load current the core will be in the RESET condition when conditions are stabilized. Then the next commutating pulse will cause commutating capacitor discharge current to flow into the dots of the windings $L_r$, $L_s$, $L_t$, $L_u$ and the core material can swing from RESET flux condition to SET flux condition, i.e., a considerably greater volt second commutating capability exists in the core with a moderate air gap. Then a considerably smaller core volume will do, and the winding can be smaller, for the same or smaller sized commutating capacitors. This saves volume, weight, and money, and the bridge is capable of changing state at a more rapid rate; i.e. the operation can be at a higher frequency.

The inductors used to provide the RESET field are $L_c$, the compensating coils. They are short circuited for the very high frequency components of the commutating pulse in commutating coils L by capacitors C and by added capacitor for energy storage $C_v$. Then commutation voltages can develop across $L_r$, $L_s$, $L_t$, $L_u$ only if the rapidly changing flux linking these coils flows through a path not linking $L_c$. This path can be the air around $L_r$, $L_s$, $L_t$, $L_u$, but better results with lower C can be had if a magnetic shunt similar to that shown in FIGURE 1 is introduced. This shunt path must have greater magnetic reluctance than the path linking $L_c$, or the RESET field of $L_c$ will be short circuited and not really reset the part of the core over which $L_r$, $L_s$, $L_t$, $L_u$ are wound. The shunt can be in another plane, have a longer magnetic path length, etc., so long as the RESET field resets the core for $L_r$–$L_u$, and there does exist a path for the rapidly changing flux which must link these coils during commutation.

The capacitor shunting compensating coils $L_c$ is large enough to store a major fraction of the commutating energy, and may be several times this value for stability reasons. It is not so large as to forbid a voltage change of the order V/2 during the energy release period when $L_r$, $L_s$, $L_t$, $L_u$ are dumping the commutation energy. Then just after the SCR turn off interval To when the bridge has switched from the positive state to the reverse or negative state, the energy release currents in the loops $L_u$, u, and $C_A$ and t, $C_B$, and $L_t$; can induce a voltage across coils $L_c$, changing the potential of $C_v$, so that a potential sink exists for the dumping of the commutation energy.

The output voltage, and the voltage across the SCR's can have undesired large transient magnitudes if the clamp diodes are not used. Diodes D are connected as shown in FIGURE 2 for fastest operation with least loss of energy and circuit heating. This maximizes the voltage across inductors $L_r$, $L_s$, $L_t$, $L_u$ and hence reduces the time required to clear the cores into the RESET condition. Using the arrangement of FIG. 2, the diodes clamp the output at $+V$ or $-V$ potential, and the SCR's see a potential this large, or SMALLER. This is due to the fact that energy release potentials developed across $L_c$ and $C_V$ are in opposition to the supply voltage V.

Following the energy release period, the potential builds up across $C_V$ to the full supply potential, and this reactive current acts to rest the core of $L_r$, $L_s$, $L_t$, $L_u$ even if the load current is small. The value of $C_V$ is typically 3 to 30 times that of commutating capacitors C. The cross sectional areas of the core segments are all approximately the same.

Transformer drive for the SCR gates is most convenient.

Figure 3:
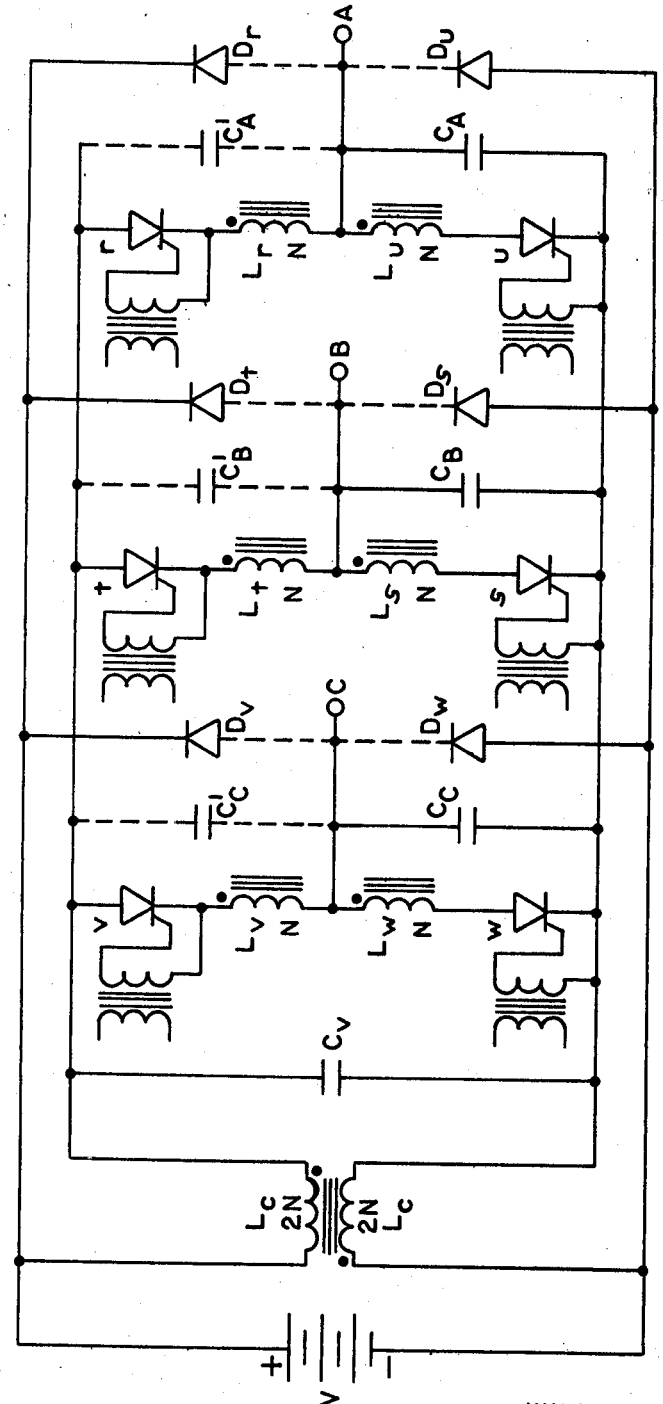
FIGURE 3 is a schematic representation of an electrical circuit using the commutating inductor of the present invention in a three phase SCR bridge.

A three phase bridge is shown in FIGURE 3. The inductor construction is like the one in FIGURE 1 but two additional commutation windings ($L_v$ and $L_w$) are provided. The operation is the same as that in FIG. 2 but expanded for three phase work.

What is claimed is:

1. In an electric power controller for controlling switching of volt amperes to a load, one or more silicon controlled rectifiers and a commutating inductor connected to one or more silicon controlled rectifiers, said commutating inductor including a low reluctance ferromagnetic path comprising a plurality of ferro-magnetic cores, a plurality of commutating inductor windings on one portion of said low reluctance path, a plurality of compensating windings on another portion of said low reluctance ferro-magnetic path, said compensating windings having currents flowing therein which are the same load current that flows through the commutating inductors and related reactive components associated with commutation, said compensating windings produce a magnetic field strength greater in magnitude and opposed in direction to the magnetic field in the commutator windings, a capacitor effectively shunting the compensating inductor, transient voltages are produced in the silicon controlled rectifier across the commutating inductor windings thereof at the instant of commutation, which transient voltages are accomplished by rapidly charging magnetic induction in the ferro-magnetic core most closely associated with the commutator inductor windings, an added ferro-magnetic core associated with the low reluctance magnetic path in such manner as to produce a moderately low reluctance magnetic path, the induction of which path may be changed rapidly as a result of transient voltages applied to the commutation inductor windings, said added ferro-magnetic core connected to the low reluctance path in a manner that the reluctance through the added ferro-magnetic core and around a loop linking compensating inductor windings considerably exceeds the reluctance of the low reluctance path linking commutating inductor windings and compensating inductor windings.

2. An electric power controller as claimed in claim 1, including means connected to the silicon controlled rectifiers for forbidding a change of state of the silicon controlled rectifiers or a sufficient time after a change of state of the silicon controlled rectifiers and the commutating action associated therewith such that currents flowing in the compensating inductors are able to essentially restore the magnetic induction in the ferro-magnetic core most associated with the commutating inductor to an inductor state equal in the magnitude and opposed in sense to that produced by commutation currents flowing in the commutator inductor windings.

3. An electric power controller, as claimed in claim 1, including means for resetting the commutation inductor winding core after it has been set by commutating currents.

4. An electric power controller, as claimed in claim 2 including clamp diodes and commutating capacitors, wherein said commutating inductor and said compensating inductor are arranged with said clamp diodes to restrict the output to the range of the high voltage supply, said commutating capacitors arranged so that the commutating inductor voltage may reach a potential in the order of half the high voltage supply during that time interval when the energy stored in the commutating inductor during commutation is being released so that more rapid commutation may be achieved and reactive currents in the inductor diodes, and silicon controlled rectifiers are materially reduced while maintaining the advantages of clamped outputs.

References Cited

UNITED STATES PATENTS

| | | | |
|---|---|---|---|
| 3,278,827 | 10/1966 | Corey et al. | 321—44 |
| 3,355,654 | 11/1967 | Risberg | 321—45 XR |
| 3,364,413 | 1/1968 | Abraham | 321—18 |
| 3,378,751 | 4/1968 | Walker | 321—18 XR |
| 3,091,729 | 5/1963 | Schmidt | 321—45 XR |
| 3,101,439 | 8/1963 | Lilienstein | 321—45 |
| 3,103,616 | 10/1963 | Cole et al. | 321—45 |
| 3,262,036 | 7/1966 | Clarke et al. | |
| 3,334,290 | 8/1967 | Landis | 321—45 XR |
| 3,336,520 | 8/1967 | Miyairi et al. | 321—45 XR |
| 3,341,765 | 9/1967 | Rogers et al. | 321—45 XR |

OTHER REFERENCES

Siemens, Zeitschrift, September 1963, pp. 660–667.

G. R. SIMMONS, Primary Examiner

U.S. Cl. X.R.

318—439; 321—45